US009008688B2

(12) United States Patent
Ding et al.

(10) Patent No.: US 9,008,688 B2
(45) Date of Patent: Apr. 14, 2015

(54) CALENDAR MATCHING OF INFERRED CONTEXTS AND LABEL PROPAGATION

(71) Applicant: QUALCOMM Incorporated, San Diego, CA (US)

(72) Inventors: Li Ding, San Diego, CA (US); Vidya Narayanan, San Jose, CA (US); Jin Won Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 13/799,442

(22) Filed: Mar. 13, 2013

(65) Prior Publication Data

US 2013/0295956 A1    Nov. 7, 2013

Related U.S. Application Data

(60) Provisional application No. 61/643,836, filed on May 7, 2012.

(51) Int. Cl.
*H04W 24/00* (2009.01)
*H04W 4/02* (2009.01)
*H04L 29/08* (2006.01)
*G06Q 10/10* (2012.01)
*H04M 1/725* (2006.01)

(52) U.S. Cl.
CPC .............. *H04W 4/025* (2013.01); *H04L 67/22* (2013.01); *H04M 1/72566* (2013.01); *G06Q 10/1093* (2013.01)

(58) Field of Classification Search
CPC ............... H04W 4/02; H04W 4/025–4/028; H04W 64/00; H04W 64/003; H04W 4/006; H04W 8/18
USPC ............. 455/456.1, 456.3, 90.1, 414.1, 414.2
See application file for complete search history.

(56) References Cited

U.S. PATENT DOCUMENTS

| 7,941,133 | B2 | 5/2011 | Aaron et al. | |
|---|---|---|---|---|
| 2002/0116459 | A1 | 8/2002 | Zuberec et al. | |
| 2004/0252197 | A1 | 12/2004 | Fraley et al. | |
| 2005/0060365 | A1 | 3/2005 | Robinson et al. | |
| 2007/0022380 | A1 | 1/2007 | Swartz et al. | |
| 2009/0248476 | A1 | 10/2009 | Trinh et al. | |
| 2010/0069115 | A1* | 3/2010 | Liu | 455/556.1 |
| 2010/0268741 | A1 | 10/2010 | Holzapfel et al. | |
| 2011/0010093 | A1 | 1/2011 | Partridge et al. | |
| 2012/0102050 | A1 | 4/2012 | Button et al. | |
| 2012/0136865 | A1 | 5/2012 | Blom et al. | |
| 2013/0165155 | A1* | 6/2013 | Katpelly et al. | 455/456.3 |
| 2013/0182576 | A1* | 7/2013 | Linsky | 370/241 |
| 2013/0267249 | A1* | 10/2013 | Rosenberg | 455/456.3 |
| 2013/0273941 | A1* | 10/2013 | Grokop | 455/456.3 |
| 2014/0237548 | A1* | 8/2014 | Hassan et al. | 726/3 |

FOREIGN PATENT DOCUMENTS

WO    01020409 A2    3/2001

OTHER PUBLICATIONS

International Search Report and Written Opinion—PCT/US13/39969—ISA/EPO—Nov. 1, 2013.

* cited by examiner

*Primary Examiner* — Temica M Beamer
(74) *Attorney, Agent, or Firm* — Kilpatrick Townsend & Stockton LLP

(57) ABSTRACT

Methods, systems, computer-readable media, and apparatuses for calendar matching of inferred contexts are described. In one potential embodiment, a mobile device may use context information to generate a calendar of inferred contexts. Label information from raw calendar data may be used to update an inferred context within a calendar of inferred contexts. Additionally, the label may be propagated to future contexts and entries in an inferred context calendar.

21 Claims, 7 Drawing Sheets

CALENDAR MATCHING OF INFERRED CONTEXTS AND LABEL PROPAGATION

CROSS-REFERENCE

This application claims priority from U.S. Provisional Patent Application No. 61/643,836, filed May 7, 2012, entitled "CALENDAR MATCHING OF INFERRED SITUATIONS AND LABEL PROPAGATION", which is hereby incorporated by reference, as if set forth in full in this document, for all purposes.

BACKGROUND

Aspects of the disclosure relate to electronic context determination. In particular, devices, systems, and methods for determining the context of an electronic device using sensor or application data available for analysis by a context engine.

In today's high-paced society, people can participate in a myriad of activities, visit dozens of places, and interact with tens to hundreds of people—all within a single day. Accurately estimating a person's situation or context may allow services or functionalities to be selectively presented or implemented.

Many mobile devices now include applications which collect data about an environment in which the device is operating and/or expected to operate in sometime in the future. Such applications may enable a mobile device to react to or change operational characteristics based upon that information. Such context awareness capabilities are becoming more and more prevalent in the communications industry. However, the large number of potential contexts makes it difficult to reliably and accurately estimate contexts.

There is a therefore a growing need for new and useful techniques and structures for implementing context awareness in communication devices.

BRIEF SUMMARY

Various embodiments described herein relate to devices, systems, and methods for determining the context of an electronic device using sensor or application data available for analysis by a context engine. For example, one embodiment comprises a method involving accessing context information associated with a mobile device; identifying, using the context information, a first inferred context of the mobile device for a first time period to create first inferred calendar information; accessing first raw calendar data associated with a user of the mobile device and the first time period; identifying from the first raw calendar data, a first label from one or more labels in the first raw calendar data; matching the first label and the first inferred context by verifying that the first label is consistent with the first inferred context; associating the context information and the first label based on the matching of the first label and the first inferred context; and updating the mobile device based on the associating the context information and the first label and based on the matching of the first label and the first inferred context.

Additional embodiments of such a method may further function where the one or more labels comprise place labeling information associated with a place identifier included in the first raw calendar data or the one or more labels comprises person labeling information associated with a person identifier included in the first raw calendar data. Still further additional embodiments of such a method may function where updating the mobile device based on the matching of the first label and the first inferred context comprises changing a second inferred context for a second time period that is later than the first time period based on the matching of the first label and the first inferred context. Additional embodiments of such a method may further function where the context information is derived from mobile device sensors, user interface inputs, and network communications.

Additional embodiments of such a method may further function where updating the mobile device based on the matching of the first label and the first inferred context comprises: matching the first inferred context to a second inferred context associated with a second time period different than the first time period using the context information; and propagating the first label to the second inferred context.

Additional embodiments of such a method may further function where propagating the first label to the second inferred context comprises altering a second label associated with the second inferred context to match the first label.

Additional embodiments of such a method may further function where the context information comprises a context stream of sensor information from a hardware sensor, and where updating the mobile device based on the matching of the first label and the first inferred context comprises associating labeling information and the sensor information.

Additional embodiments of such a method may further include accessing second raw calendar data associated with the user of the mobile device and the first time period; identifying from the second raw calendar data, a second label from one or more labels in the second raw calendar data; determining that the second label is inconsistent with the first inferred context prior to associating the context information and the first label based on the matching of the first label and the first inferred context.

An alternative embodiment may be a device comprising a sensor that accesses context information associated with the device; a memory that stores raw calendar data including a first raw calendar data comprising at least a first label; a processor that receives the context information from the sensor and identifies, using the context information, a first inferred context of the device for a first time period to create first inferred calendar information, that further receives the first raw calendar data and identifies the first label from one or more labels in the first raw calendar data, that matches the first label and the first inferred context by verifying that the first label is consistent with the first inferred context, that associates the context information and the first label based on the matching of the first label and the first inferred context, and that updates the device based on the associating the context information and the first label.

Alternative embodiments of such a device may additionally include a display module coupled to the processor where an output to the display module from the processor is adjusted as part of the update of the device based on the associating of the context information and the first label.

Alternative embodiments of such a device may function where the sensor comprises a location module comprising a global positioning system receiver that receives location signals and wherein the context information identifies a location of the device. Alternative embodiments of such a device may function where the sensor comprises a Bluetooth module, and wherein the context information identifies other Bluetooth modules in proximity to the device or where the sensor comprises a calendar application executed by the processor with the context information comprising the first raw calendar data.

Alternative embodiments of such a device may further include a user input module that receives rules and constraints from a user, wherein the adjustment to the output to the display module is based on the rules and constraints.

Another alternative embodiment may include a device comprising: means for receiving context information associated with the device; means for receiving raw calendar data including a first raw calendar data associated with the device; a processor that receives the context information and identifies, using the context information, a first inferred context of the device for a first time period to create first inferred calendar information, that further receives the first raw calendar data and identifies a first label from one or more labels in the first raw calendar data, that matches the first label and the first inferred context by verifying that the first label is consistent with the first inferred context, and that associates the context information and the first label based on the matching of the first label and the first inferred context; and means for updating the device based on the associating the context information and the first label.

Still another alternative embodiment may be a non-transitory computer readable memory comprising computer readable instructions that, when executed by a processor, cause a device including the processor to perform a method of context inference comprising: accessing context information associated with a mobile device; identifying, using the context information, a first inferred context of the mobile device for a first time period to create first inferred calendar information; accessing first raw calendar data associated with a user of the mobile device and the first time period; identifying from the first raw calendar data, a first label from one or more labels in the first raw calendar data; matching the first label and the first inferred context by verifying that the first label is consistent with the first inferred context; associating the context information and the first label based on the matching of the first label and the first inferred context; and updating the mobile device based on the associating the context information and the first label and based on the matching of the first label and the first inferred context.

In alternative examples of such an embodiment of a non-transitory computer readable memory, the method performed by execution of the computer readable instructions may further comprise: accessing second raw calendar data associated with the user of the mobile device and the first time period; identifying from the second raw calendar data, a second label from one or more labels in the second raw calendar data; and determining that the second label is inconsistent with the first inferred context prior to associating the context information and the first label based on the matching of the first label and the first inferred context.

Another alternative embodiment may be a device comprising: means for accessing context information associated with the device; means for identifying, using the context information, a first inferred context of the device for a first time period to create first inferred calendar information; means for accessing first raw calendar data associated with a user of the device and the first time period; means for identifying from the first raw calendar data, a first label from one or more labels in the first raw calendar data; means for matching the first label and the first inferred context by verifying that the first label is consistent with the first inferred context; means for associating the context information and the first label based on the matching of the first label and the first inferred context; and means for updating the device based on the associating the context information and the first label and based on the matching of the first label and the first inferred context.

Alternative embodiments of such a device may further function where the context information comprises location signature information received, at least in part, by a network assisted location service.

Alternative embodiments of such a device may further include means for updating a user interface presented by the device based on the associating the context information and the first label and based on the matching of the first label and the first inferred context.

While context is provided herein by describing particular examples, it will be understood that further alternative examples to those specifically provided herein will be possible while remaining within the scope of the innovations presented herein, and various changes may be made in the function and arrangement of elements without departing from the spirit and scope of various embodiments.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1A:
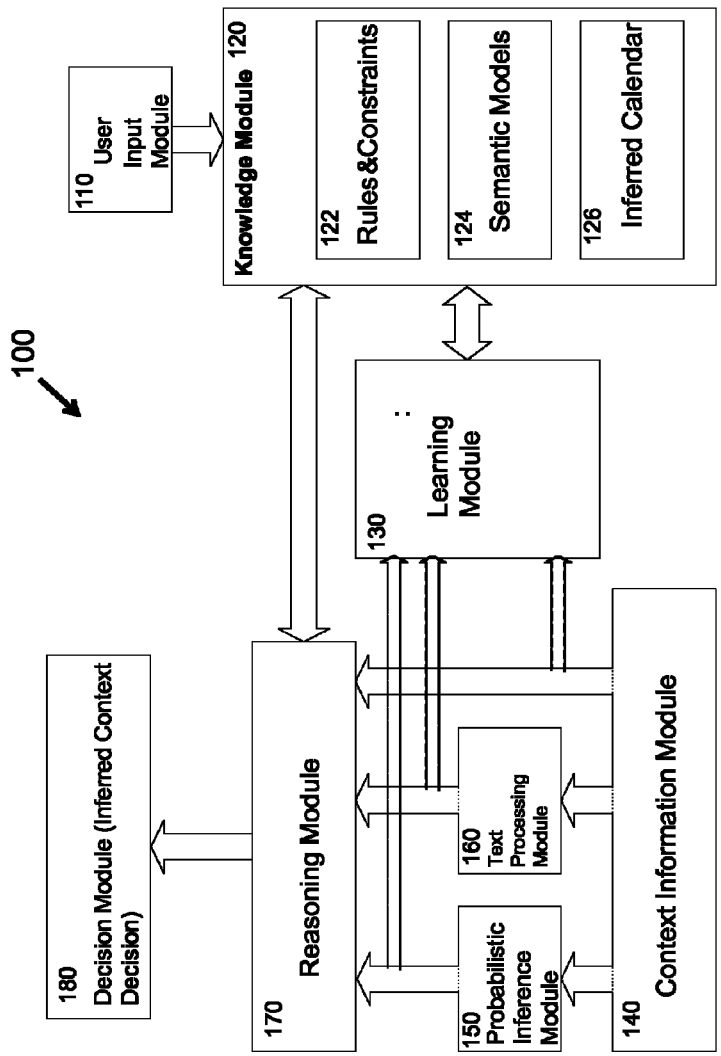
FIG. 1A illustrates a system diagram of a context engine for use in one potential embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Embodiments are directed to matching raw calendar data to inferred contexts, and propagating information matched in this way to future inferred contexts to improve functionality of the context inference system. Systems, methods, and devices that use calendar information matched with other context information may improve the ability to reliably and accurately estimate contexts, and may enable labeling of unknown locations or contexts which may enable improved context for that location in the future. Such systems, methods, and devices may also enable improved function of applications operating on a device that use inferred contexts to function by improved prediction of expected inferred contexts for a particular time frame. For example, suppose that a calendar event indicates that a meeting with Bob is scheduled from 1 pm-2 pm at Conference Room A. If it is 1:15 PM, a current location signature (detected using positioning technology from a GPS satellite signal or a network assisted location system that may use WiFi signature-based technology) may be associated with a location label Conference Room A, and a nearby Bluetooth signature may be associated with Bob.

The current location signature and Bluetooth signature may be considered context information. If, on the other hand, the speed context of the device is 60 mph, an assumption may be made that the meeting is not being attended based on the 60 mph context information. If the inferred context is that the meeting is being attended, location labels may be associated with both the location signature and the Bluetooth signature and may be reused in future context analysis. For example, the location label may be propagated to future calendared meetings with similar identifiers, and the meeting inferrence made by the device may occur more quickly if a Bluetooth signature associated with Bob is seen during the future time that the meeting is scheduled. The use of multiple streams of context information may thus provide a smoother context presentation at a device, and may further improve the accuracy and speed of inferred context creation and prediction.

As used herein, "context information" refers to data that is received at a computing system for use in inferring context. Such information may be from hardware transceivers that directly measure a physical aspect of the environment, such as light, sound, or device movement. Such information may be considered as coming from "hard" sensors such as global positioning systems (GPS), microphones, wireless antennas, accelerometers, magnetometers, gyroscopes, Bluetooth systems, WIFI systems, ambient light monitors, proximity monitors, cameras, pressure sensors, temperature sensors, or any other such similar hardware sensors. Context information may additionally be abstract information stored by an application within a device. Calendar, contact, or profiles identifying other parties or devices interacting with a user or user device may be examples of such abstract information. Such context information may be considered as coming from "soft" or "software" sensors such as calendar, email, SMS log, call log, application usage, or other such device applications functioning as sensors to input data to a context system.

As used herein, "context" is used to describe a situation in which a device is operating. Examples of contexts include: busy, available, in meeting, traveling in a car, traveling in a plane, at home, in the office, at the gym, eating, or any other such concept of an environment. The environment context may then be used by a device to select settings. For example, if a context is "traveling in a plane" a device may be set to automatically reply to phone messages indicating that the user is unavailable. If a context is "in meeting" a ringer may automatically be silenced.

In an example, a device may access information indicative of a context of a mobile device and calendaring information associated with a user of the mobile device. One or more labels may be updated based on the information indicative of the context of the mobile device and the calendaring information. For example, the information indicative of the context may indicate that the user is in a meeting, and a calendar entry may indicate that the user is scheduled to participate in a meeting at a particular room with a room label. In response to these indications, information that indicates a location signature of the mobile device may be associated with the room label obtained from the calendar information. For the example of WiFi positioning, an identifier for one or more WiFi access points, and/or signal strength or other information about the WiFi access points may be associated with the place label. For some positioning techniques, a latitude, longitude, and/or altitude (or similar information such as street address and optionally floor indication) may be associated with the place label.

In another example, the context information may indicate that the user is in a meeting, and place label information may already be available for the room of the meeting (for example by a previous use of the techniques described above). However, there may be one or more speakers that are not identifiable to the system. The calendar information may access the label information for the meeting attendees, and associate one or more of the attendees with audio information. This information may be stored for future use.

Similarly, as used herein "inferred context" refers to the computer implemented decision making by a device to determine what context the device is currently operating under. Inferred context describe any inference (high or low-level) that can be made from sensor data. The list of possible contexts may be application specific to a particular context system or context engine. The contexts may be inferred from a single sensor (uni-modal data) or from multiple sensors (multi-modal data). Some sample lists are: enterprise situation inference (in meeting, working alone, lunch, gym, commuting, lecture); type of motion (vehicular motion, pedestrian motion, stationary); motion state classification (walking, running, sitting, standing, fiddling, resting, driving); speech detection (speech, no speech); indoor/Outdoor detection (indoor, outdoor); meeting detection (in a meeting, not in a meeting); location detection (within 500 feet of a GPS coordinate, within a location identified by a WIFI-based signature); or any other such context. In certain embodiments, and expected inferred context may be an inferred context associated with a future time. As additional context information associated with that time becomes available, the expected inferred context may be updated. Finally, during the actual time, real-time or recent context information may be gathered to identify a current context of the device, using both the expected inferred context and any additional context information received during the time when the expected inferred context was expected.

In certain embodiments, expected or future inferred contexts may be aggregated as an inferred calendar. As described herein, "inferred calendar" refers to a calendar of time frames for which context information is available to create an expected inferred context for the various time frames. The inferred calendar may also store historical inferred contexts from past time frames where an inferred context was determined and used. "Inferred calendar information" refers to any information used in an inferred calendar, and may include past, present, and future inferred contexts, lists of the context information used to create these inferred contexts, and labels associated with context information and/or inferred contexts.

By contrast, "raw calendar data" refers to information stored in a calendar application or function of a device. Such information may be entered by a user, a third party with access to a user's calendar, or by an application accessing a calendar application. Such raw calendar data may include descriptions of events associated with a particular time. These descriptions may include identifying information for people, places, and/or activities associated with the particular time.

"Labels" refers to identifying information associated with a particular time, as described above. Labels may be created and associated with a particular time in a variety of ways. In one potential embodiment, a text parser may parse through descriptions that are part of raw calendar data to identify key terms. Those terms may be identified as labels, or may be associated with labels by an analysis such as a linguistic analysis of synonyms, antonyms, or other previously identified relationships between the raw calendar data and a label. In one particular example, a certain phone number may be identified along with a history of where the phone number was dialed from. If 100% of the time based on a sufficiently large sample size, the number was dialed from a user's office, the label "office" may be associated with the phone # from the raw calendar data. In previous examples, location labels can be extracted from raw calendar data as part of description of an event.

Figure 6:
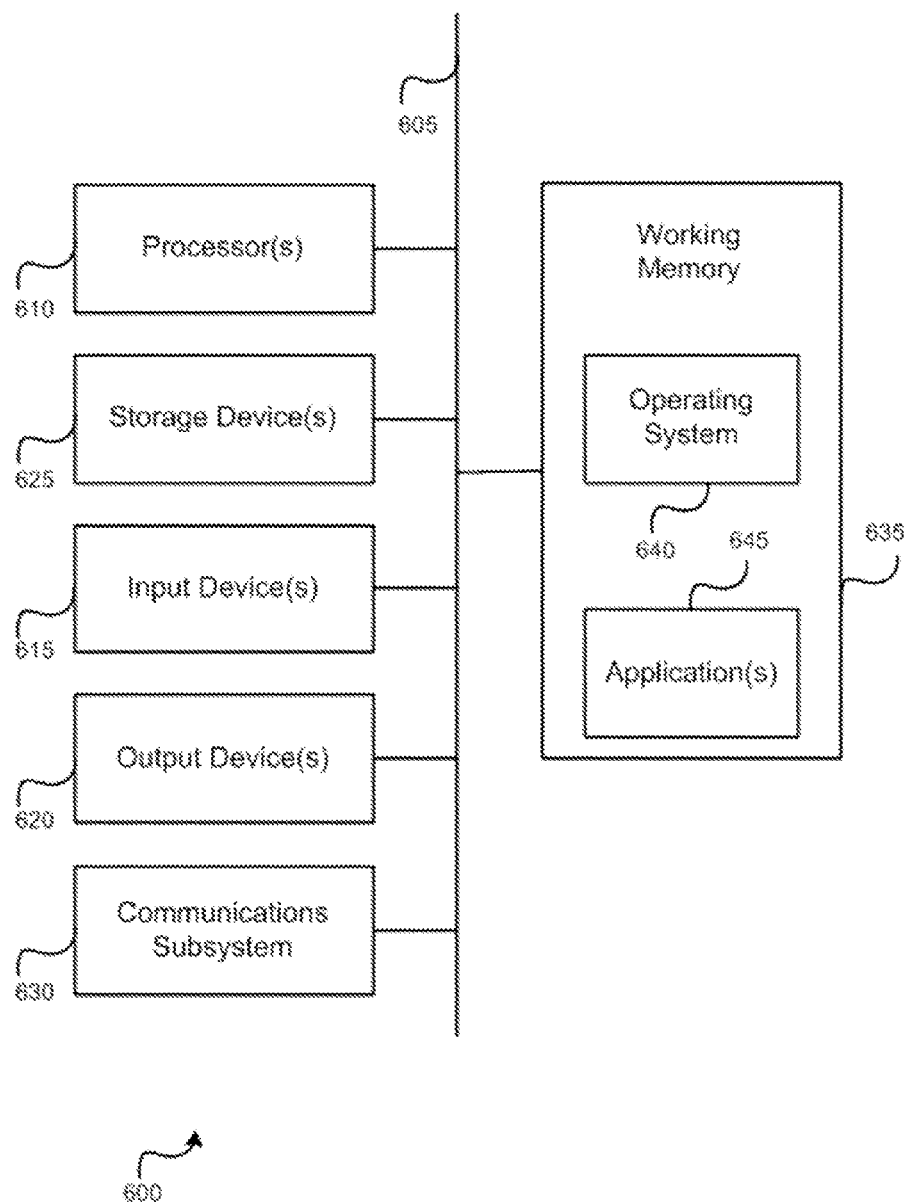
FIG. 6 illustrates an example of a computing system in which one or more aspects may be implemented according to various embodiments.

As used herein, the terms "computer," "personal computer" and "computing device" refer to any programmable computer system that is known or that will be developed in the future. In certain embodiments a computer will be coupled to a network such as described herein. A computer system may be configured with processor-executable software instructions to perform the processes described herein. Such computing devices may be mobile devices, such as a phone, data assistant, tablet computer, or other such mobile device. Alternatively, such computing devices may not be mobile, in the case of server computer, desktop computing systems, or systems integrated with non-mobile components. FIG. 6 provides additional details of a computer as described below.

As used herein, the term "component," "module," and "system," is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

FIG. 1A describes one potential implementation of a context engine 100 that may function to create inferred and/or aggregated context decisions. Context engine 100 includes user input module 110, knowledge module 120, learning module 130, context information module 140, probabilistic inference module 150, text processing module 160, reasoning module 170, and decision module 180.

User input module 110 may function as any input system for receiving user settings for a context system. In certain embodiments, user input module 110 may include a user registration for a context service, including an input of user registration information via a web server or other such registration services. User input module 110 may also function to receive user context selections and settings for storage in knowledge module 120. For example, a user may identify particular contexts which the user wants to have automatically inferred by context engine 100. The user may additionally identify settings for each identified context, such as sound settings, application settings, and user interface settings that may change between different contexts. The user may also specifically identify contexts not to be inferred, and may also identify a default context and device settings for a default context to be used when the context engine 100 is unable to adequately infer a context.

Knowledge module 120 may include a record of models, rules, and context history to improve context decision making. As shown in FIG. 1A, knowledge module may include rules and constraints 122, semantic models 124, and inferred calendar 126. Rules and constraints may be rules and limits set by a device on device control available to a context system upon determination of an aggregated context decision. Rules and constraints 122 may also include user settings. Semantic models 124 may include tailored or customizable rules for context information when text is used to infer context. For example, in certain embodiments "coffee" in a calendar may be interpreted to be equivalent to "meeting" or a particular type of meeting. Specific language usage identified over time as associated with particular contexts may also be included in semantic models 124, as a learning module 130 identifies, updates, and improves context decision making based on context information, and stores learned information in inferred calendar 126. Inferred calendar 126 may therefore store a history of inferred contexts; details of the context information, models, and inference processes used to create the historical, current, and expected inferred contexts; feedback received from user usage or input related to the quality or accuracy of inferred contexts; and any other information relevant to inferred contexts. Such information may then be used in future creation of inferences for users.

Learning module 130 may also identify errors or misassignment of inferred contexts in order to improve future operation of context engine 100. Such errors may be identified in response to user feedback, or may be identified by contexts changing in unexpected ways, or by user device usage out of character with a current inferred context. Such learning may additionally be an option set by a user to allow learning module 130 to automatically update rules and constraints 122 based on learned successes in inferring contexts.

Context information module 140 may serve to gather context information from sensors, and to communicate that information to various analysis modules for use in inferring context. Probabilistic inference module 150, text processing module 160, and reasoning module 170 may each comprise different methods for inferring context from context information. Probabilistic inference module 150 may include analysis of expectations that may be derived from context data, and text processing module may parse text information that is received as context information to identify contexts which are consistent with the identified text. All of this information, including multiple streams of context information and various inferences or intermediate context inferences may be communicated to a reasoning module 170 which may use predefined rules with learned rules and context knowledge or history to analyze context information in various forms. Decision module 180 may then identify one or more final inferred context or aggregated context decisions from all of the received context information and analysis. In certain embodiments, for example, certain contexts may be related, and compatible, such that multiple contexts and their associated rules be selected at the same time, as is discussed further with respect to FIG. 1B.

In certain embodiments, this decision from decision module 180 may be that there is excessive uncertainty, and no inferred context may be identified. In one example embodiment, multiple potential contexts may be identified by reasoning module 170, and a score assigned to each potential context. If the highest score is below a threshold set by rules and constraints 122, then the decision module 180 may set a default context as no aggregated context was identified.

Figure 1B:
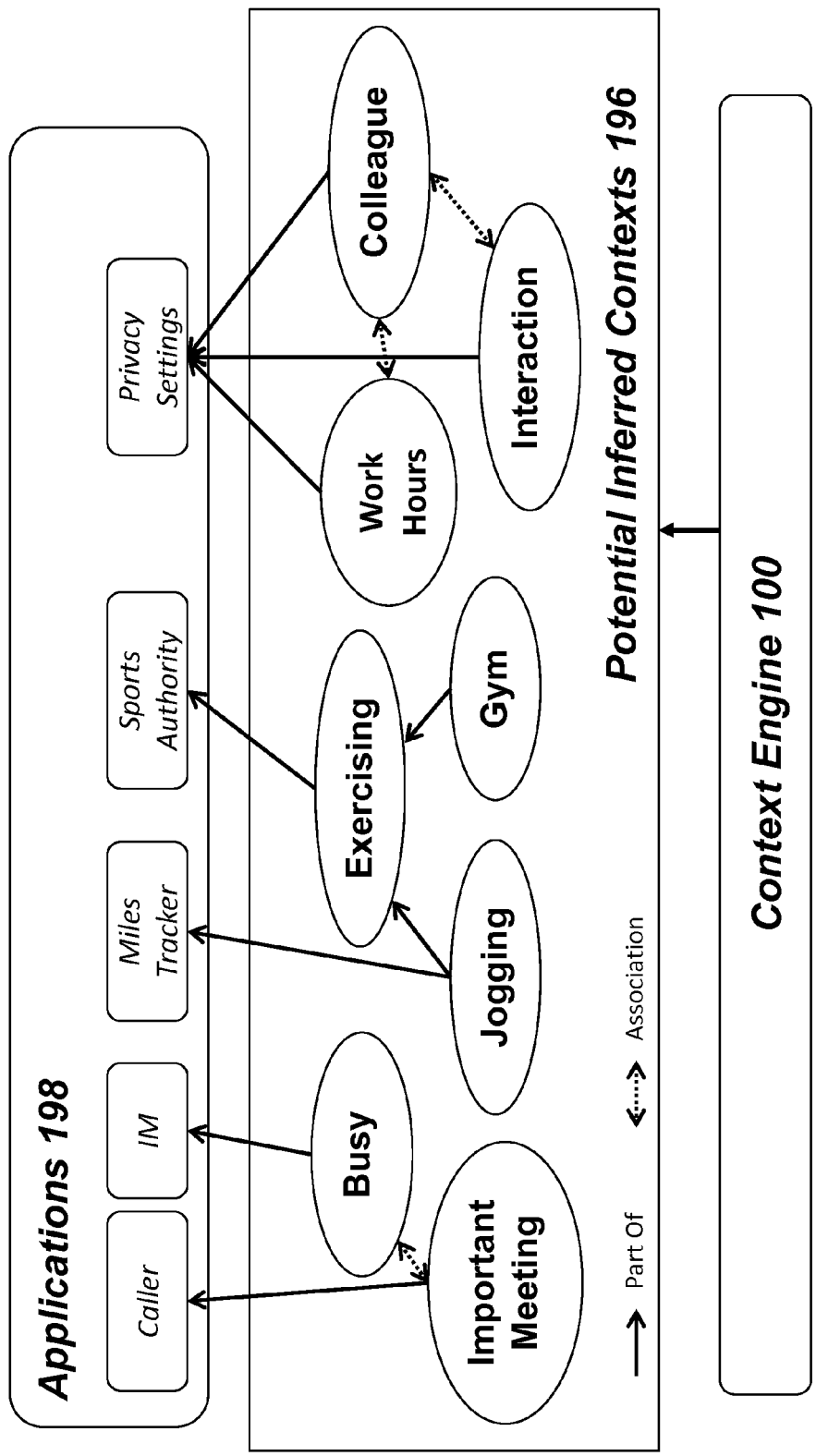
FIG. 1B illustrates a system for control of applications in a device according to one potential embodiment.

FIG. 1B further illustrates a context system which may operate in conjunction with a context engine 100 described in FIG. 1A. FIG. 1B includes context engine 100, potential inferred contexts 196, and applications 198. In one potential embodiment, these may all exist on a single mobile device. In alternate embodiments, different modules of a context engine or contexts inferred by a context engine may be implemented on a device networked to the mobile device, and may communicate with the mobile device via a network. When a final inferred context or aggregated context is identified from all potential inferred contexts 196 by context engine 100, the system may function to call or provide particular settings to selected applications 198.

For example, in certain embodiments if "busy" is identified as the inferred context, the instant messaging may have certain settings invoked. If "important meeting" is the inferred context, then certain calling rules may be invoked, and rules associated with the "busy" context may also be invoked, since the contexts are associated. Similarly, if "jogging" is identified as an inferred context, the miles tracker application on a mobile device may be activated, and a sports authority application may also be automatically invoked. Similarly, privacy settings for particular applications or an entire device may be set for applications 198 depending on the identified inferred context output from context engine 100. Thus a context system may operate to provide functionality via applications 198 in response to context engine 100 identifying one or more inferred contexts from potential inferred contexts 196.

Figure 2:
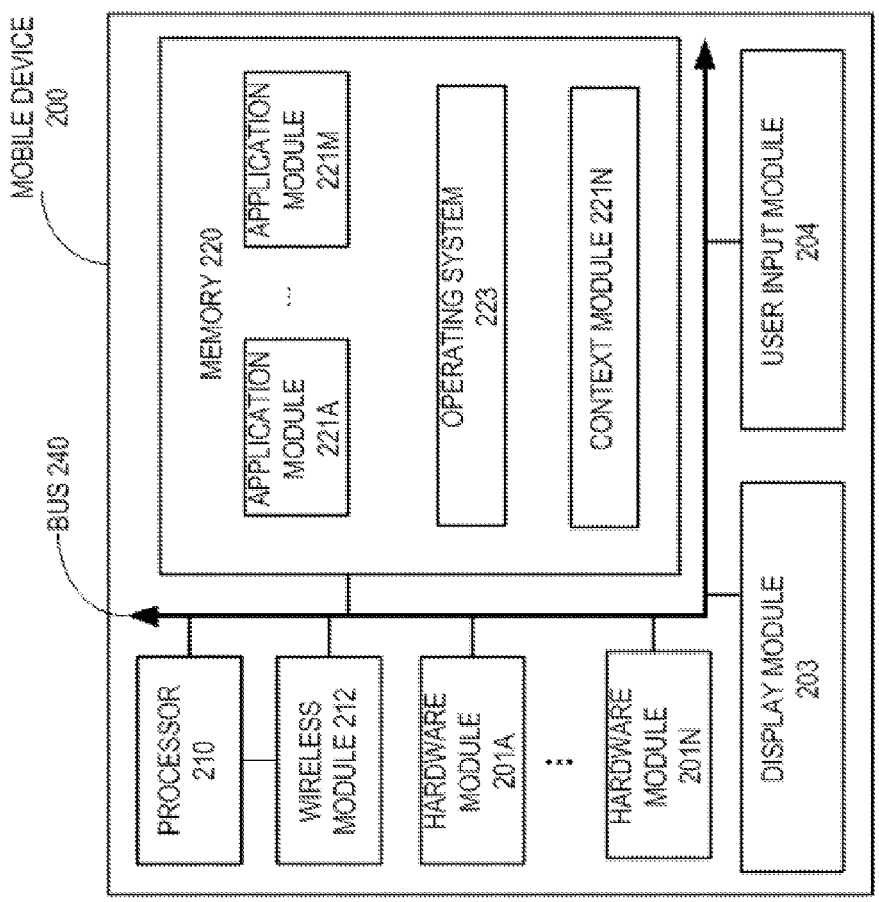
FIG. 2 illustrates a mobile device for use with a context system in accordance with various embodiments.

FIG. 2 is block diagram illustrating one potential embodiment of a mobile device that may be used in conjunction with embodiments described herein. Such mobile devices may include hardware, software, or firmware to implement all or part of a context inference system, either alone or in conjunction with additional networked computing devices. Such a context system may be a mobile device 200, which may be any mobile device such as a smart phone, cellular phone, personal digital assistant, tablet computer, personal media player as well as any other type of portable electronic device offering similar or combined functionality. Such a mobile device 200 may implement any aspects of context engine 100 or applications 198 as shown in FIG. 1.

It should be appreciated that device 200 may also include tactile buttons, a power device (e.g., a battery), as well as other components typically associated with a portable electronic device. Accordingly, FIG. 2 is not to be construed as limiting because some components are omitted.

In the embodiment shown at FIG. 2, device 200 includes processor 210 configured to execute instructions for performing operations at a number of components and can be, for example, a general-purpose processor or microprocessor suitable for implementation within a portable electronic device. Processor 210 is communicatively coupled with a plurality of components within mobile device 200. To realize this communicative coupling, processor 210 may communicate with the other illustrated components across a bus 240. Bus 240 can be any subsystem adapted to transfer data within mobile device 200. Bus 240 can be a plurality of computer buses and include additional circuitry to transfer data.

Memory 220 may be coupled to processor 210. In some embodiments, memory 220 offers both short-term and long-term storage and may in fact be divided into several units. Memory 220 may be volatile, such as static random access memory (SRAM) and/or dynamic random access memory (DRAM) and/or non-volatile, such as read-only memory (ROM), flash memory, and the like. Furthermore, memory 220 can include removable storage devices, such as secure digital (SD) cards. Thus, memory 220 provides storage of computer readable instructions, data structures, program modules, and other data for mobile device 200. In some embodiments, memory 220 may be distributed into different hardware modules.

In some embodiments, memory 220 stores a plurality of application modules 221A-221M. Application modules 221A-221M contain particular instructions to be executed by processor 210. Memory 220 can store any number of application modules. A respective one of application modules 221A-221M can be, for example, a calendar application, a map location application, a power management application, a smart alert application, a social media application (e.g., Twitter™ or Facebook™), an accelerometer application, a weather application, a temperature presentation application, or any application-type module having instructions to be executed by processor 210. In certain embodiments, sensors operated by a mobile device may have associated applications, such that context information from sensors operated by mobile device 200 may be accessed by an application rather than directly from a sensor or sensor firmware.

In one potential embodiment, context inference systems may operate as a special context module 221N. Such a module may implement any operation, determination, or calculation associated with determining a context of mobile device 200 as described in various embodiments. For example, context module 221N may gather context information from sensors and other applications, determine inferred contexts from individual sets of context information, generate an inferred context calendar, and control context based changes to mobile device 200 such as varying interface settings based on an inferred context.

In some embodiments, memory 220 includes an operating system 223. Operating system 223 may be operable to initiate the execution of the instructions provided by application modules 221A-221N and/or manage hardware modules 201-502. Operating system 223 may be adapted to perform other operations across the components of device 200 including threading, resource management, data storage control and other similar functionality.

In some embodiments, mobile device 200 includes one or more wireless modules 212. Wireless modules 212 may include a Wi-Fi transceiver, a transceiver for communicating with cellular telephone towers, or any other such module for implementing wireless communications. Such wireless modules 212 may be used as part of mobile device 200 and applications 201-202 to communicate with servers which may assist in context determination. For example, in certain embodiments, context module 221N may communicate context information over wireless module 212 to assistance servers which may assist in determining an inferred context. Analyzed data or context associated information may then be returned to mobile device 200 via wireless module 212 for setting an inferred context at mobile device 200.

Additionally, in some embodiments, mobile device 200 includes a plurality of hardware modules 201-202. Each of hardware modules 201-202 is a physical module within device 200. However, while each of hardware modules 201-202 is permanently configured as a structure, a respective one of hardware modules 201-202 may be temporarily configured to perform specific functions or temporarily activated. A common example is an application module that may program a camera module (i.e., hardware module) for shutter release and image capture. A respective one of hardware modules 201-202 can be, for example, an accelerometer, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the hardware modules 201-202 may be implemented in firmware or software as various modules.

In addition to hardware modules 201-202 and application modules 221A-221M, mobile device 200 may have a display module 203 and a user input module 204. Display module 203 graphically presents information from device 200 to the user. This information may be derived from one or more application modules 221A-221M, one or more hardware modules 201-202, a combination thereof, or any other suitable means for resolving graphical content for the user (e.g., by operating system 224). Display module 203 can be liquid crystal display (LCD) technology, light emitting polymer display (LPD) technology, or some other display technology. In some embodiments, display module 203 is a capacitive or resistive touch screen and may be sensitive to haptic and/or tactile contact with a user. In such embodiments, the display module 203 can comprise a multi-touch-sensitive display.

Additional embodiments of a mobile device may further comprise various portions of computing devices as are detailed below with respect to FIG. 6.

Figure 3:
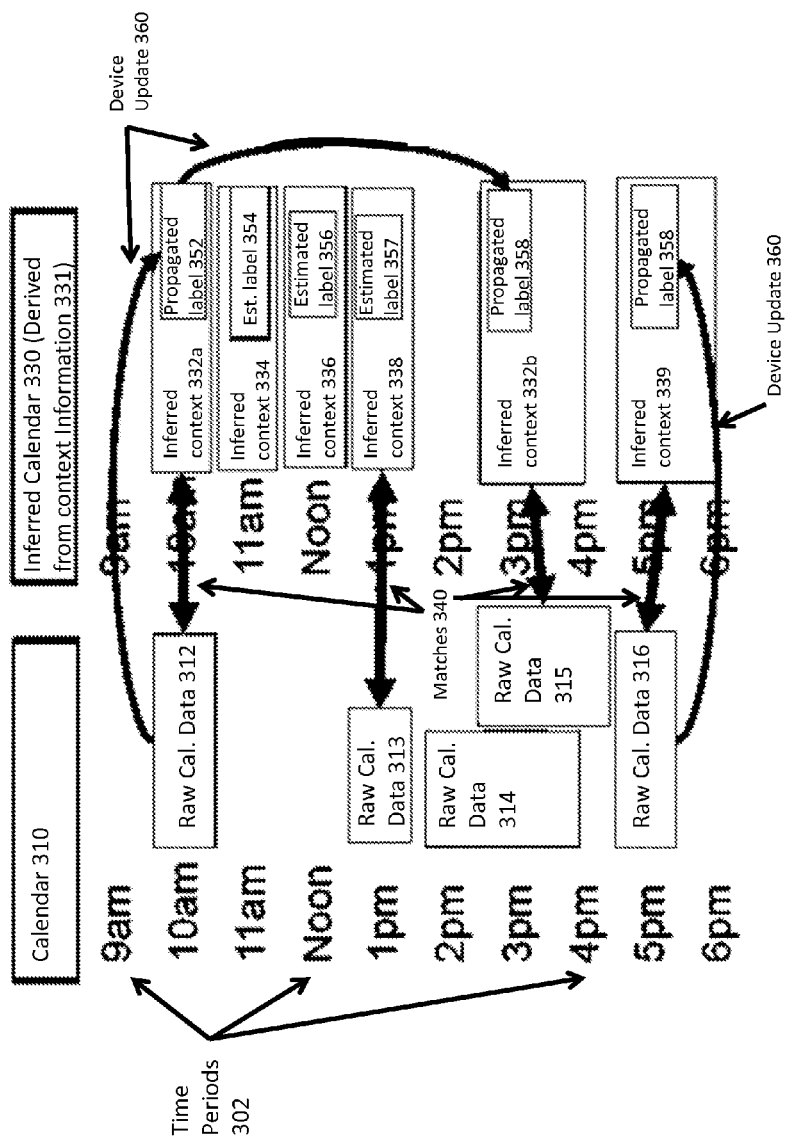
FIG. 3 illustrates a method for matching and propagating labels for inferred situations.

FIG. 3 illustrates matching and propagation of labels from raw calendar data within calendar 310 to inferred contexts in an inferred calendar 330. Calendar 310 is made of raw calendar data 312-316. Inferred calendar 330 is derived from context information 331 and comprises inferred contexts 332*a*, 332*b*, 334, 336, 338, and 339. Context information may be, for example, location signature information that identifies physical coordinates or other position information associated with a device, or any other such context information described herein. Both calendar 310 and inferred calendar 330 identify time periods 302. Time periods may be associated with particular raw calendar data or inferred contexts. Such time periods may be identified by spans of particular years, months, days, hours, minutes, and seconds or fractions of any of these, or may be identified by start and stop times using any time reference or time code.

Matches 340 may then be made between particular raw calendar data and inferred contexts. In FIG. 3, matches are shown between raw calendar data 312 and inferred context 332*a*, raw calendar data 313 and inferred context 338, raw calendar data 315 and inferred context 332*b*, and raw calendar data 316 and inferred context 339. In various embodiments, only portions of the time associated with raw calendar data may overlap with a matched inferred context.

For example, raw calendar data 312 (which may comprise or include information relevant to location label 334*b*) and inferred context 332*a* (which may be associated with, for example, a first position signature derived from context information 331) may be matched because they occur within a sufficiently close time frame. This match may occur based on an exact time frame match, based on an identified time window which is acceptable for a match, or based on any other such match that may be used to associate raw calendar data 312 with inferred context 332*a*. This then enables an association between location label 334*b* and a position signature derived from context information 331 that was used to identify inferred context 332*a*.

For overlapping events in calendar 310 shown between 3 and 4 PM, there are two arranged events. These are shown as raw calendar data 314 and raw calendar data 315. Raw calendar data 315 may, for example, include the same label information as raw calendar data 312. When 3 PM arrives, the device may identify that the device is in the first location, which is the same location identified above for inferred context 332*a*. Since the system previously associated propagated label 352 with the first location from context information 331, when the device identifies that it is in the first location at 3 PM, the device may set propagated label 352 as propagated label 358, and may further infer that the device is in the same context at 3 PM as at 10 PM, further based on the match with raw calendar data 315 identified from the label match between label information in raw calendar data 312 and raw calendar data 315. The label information may further be used to verify that the inferred context 332*b* is not associated with raw calendar data 314 if label information from raw calendar data 314 does not match the location signature and propagated label from inferred context 332*a*. The propagated location label 352 is thus used to improve the confidence that raw calendar data 315 is more appropriately associated with the correct inferred context for the 3-4 PM time frame based on the location signature match and label propagation.

In additional similar embodiments, example raw calendar data 315 may create an expected inferred context 332*b* lasting until a particular meeting end time, but real-time or recent context information indicating a change in inferred context may change inferred context 332*b* to a new context at an earlier time than expected. Location signature information indicating that a user has left a room before a meeting was scheduled to be over may create such a situation. Similarly, an inferred context may not be identified for certain time periods, as discussed above and shown between inferred context 338 and inferred context 332*b*.

Further, calendar 310 may include conflicting raw calendar data, such as when meetings are scheduled for overlapping time periods, as shown with raw calendar data 314 and 315. In such circumstances, other context information may be used to identify a most likely inferred context associated with either raw calendar information 314 or 315, assuming these are associated with separate distinct meetings that have not been merged. The other context information may be used to identify that one set of raw calendar data is consistent with the context information, such as location and meeting attendees, while the other set of raw calendar data is inconsistent with the other context information. All this information may then be aggregated to create or update the inferred context in inferred calendar 330.

FIG. 3 further describes device updates that may occur in response to a calendar match, and an association between a label identified within raw calendar data and context information that was used to derive an inferred context. For example, within a device, information associated within an inferred context may be updated to add a label. Propagated label, for example, may be identified within raw calendar data 316 and associated with inferred context 339 and any context information associated with inferred context 339. Similarly propagated label 352 may be identified within raw calendar data 312 and used to update a device may adding propagated label 358 as a copy of propagated label 352 to inferred context 332*a*. This may result in an additional propagation, where a new association between propagated label 352 and context information associated with inferred context 332*a* may be used to assign the label to inferred context 332*b*, which may be the same or a similar context to inferred context 332*a*. In addition, certain labels may be considered estimated labels. For example, raw calendar data 313 may not contain any labels, but may contain information from which a label may be probabilistically inferred. Such a label may also be determined using past history or a particular analysis system within a context engine. For example, history data may be used to create an estimated label, predetermined rules may be set to match certain types of information with labels, and statistical learning may generate, improve, and apply labels. Additional embodiments and examples of device updates in accordance with various embodiments may be further described below.

Figure 4:
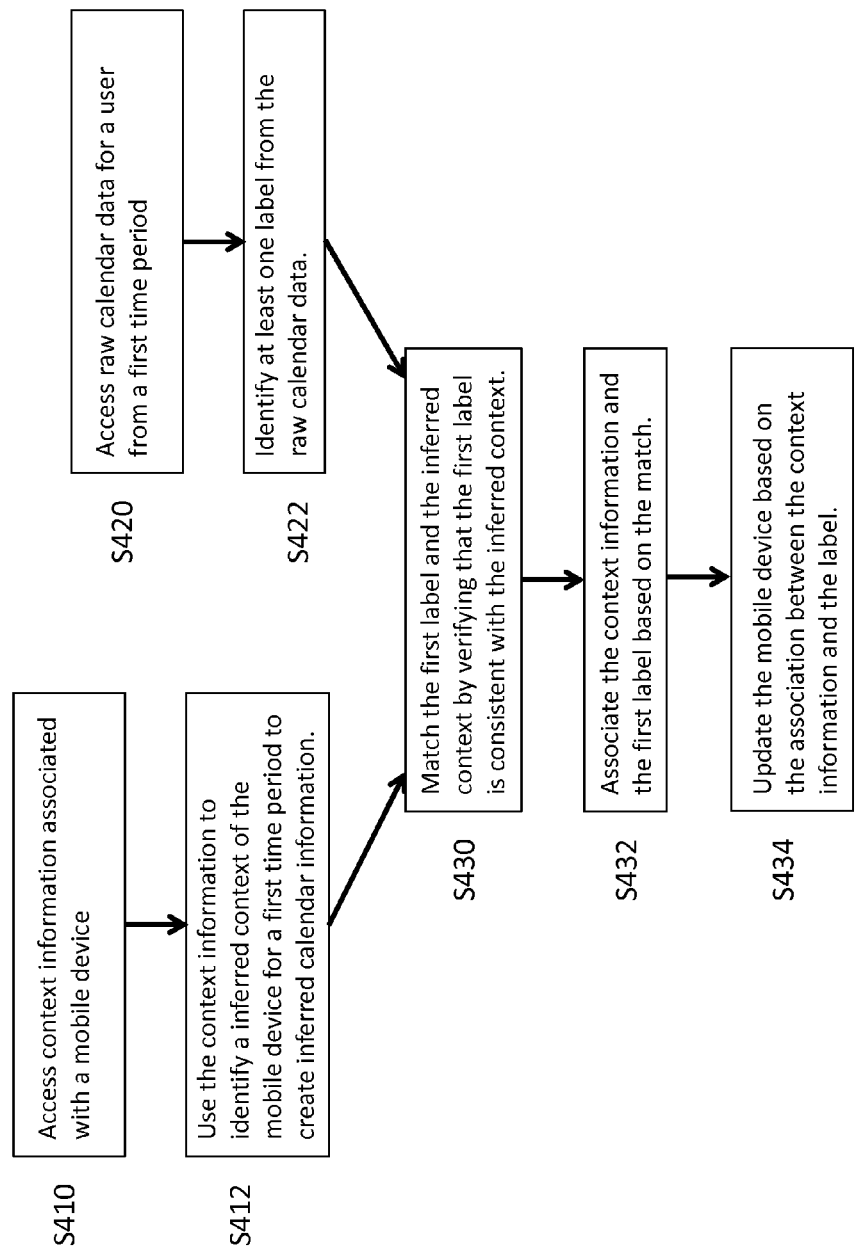
FIG. 4 describes a method of determining an inferred context in accordance with one potential embodiment.

FIG. 4 describes one potential method for calendar matching of inferred contexts and label propagation. In S410, context information associated with a mobile device may be accessed. In the simplest case, this may simply be raw calendar information identifying a future event. Alternatively, as described above, this may be any other such information, such as location data showing a repeating pattern that may be used to predict a future location, such as a coffee shop with an associated order application that is accessed and visited regularly between 6 AM and 6:30 AM on weekdays. This may also be associated with a particular room that is visited weekly within a work location. In S412, this information may then be used to identify an inferred context. For example, even though no raw calendar information is associated with the coffee shop described above, this location information may be used to create an expected inferred context for Monday through Friday in the time period from 6 AM to 6:30 AM. Similarly with the room, an inferred meeting may be identified. Later, during the associated time period, additional location information and/or usage of a payment application associated with the coffee shop may verify or increase a confidence in the inferred context.

In S420, raw calendar data is accessed for a user during the same time period associated with the context information and the time period of S412. In the example of a weekly trip to a particular room within a work location, if a single calendar entry with raw calendar information is entered during the time when the weekly trip to the room occurs, this raw calendar information may be accessed. In S422, then the raw calendar information is analyzed to identify at least one label. For example, "Room A" may be a label in such raw calendar data. In S430, then, the first label and the inferred context may be matched. This may occur, for example, by verifying that the user returns to the same location during the weekly time period when the previous trips to the particular room occurred. A previously inferred context may then be associated with to the context information in S432 after the verification of consistency occurs. Continuing with the location example, the location may be labeled as "Room A." In S434, then, the mobile device is updated based on the created association between the context information and the label. In the example, this may equate to identifying a historical record of visits to the location, and updating a history database with the label "Room A" for each visit. This may also involve updating expected inferred contexts for the weekly time with the label "Room A" based on a sufficient confidence that the weekly visits to the location will continue, even if raw calendar data is not identified to indicate this. Later, if the weekly meetings end, the expected inferred contexts may end, but the association of particular location information with the label "Room A" may continue to be used until conflicting information is received, or the information is deemed to be irrelevant due to lack of use.

Figure 5:
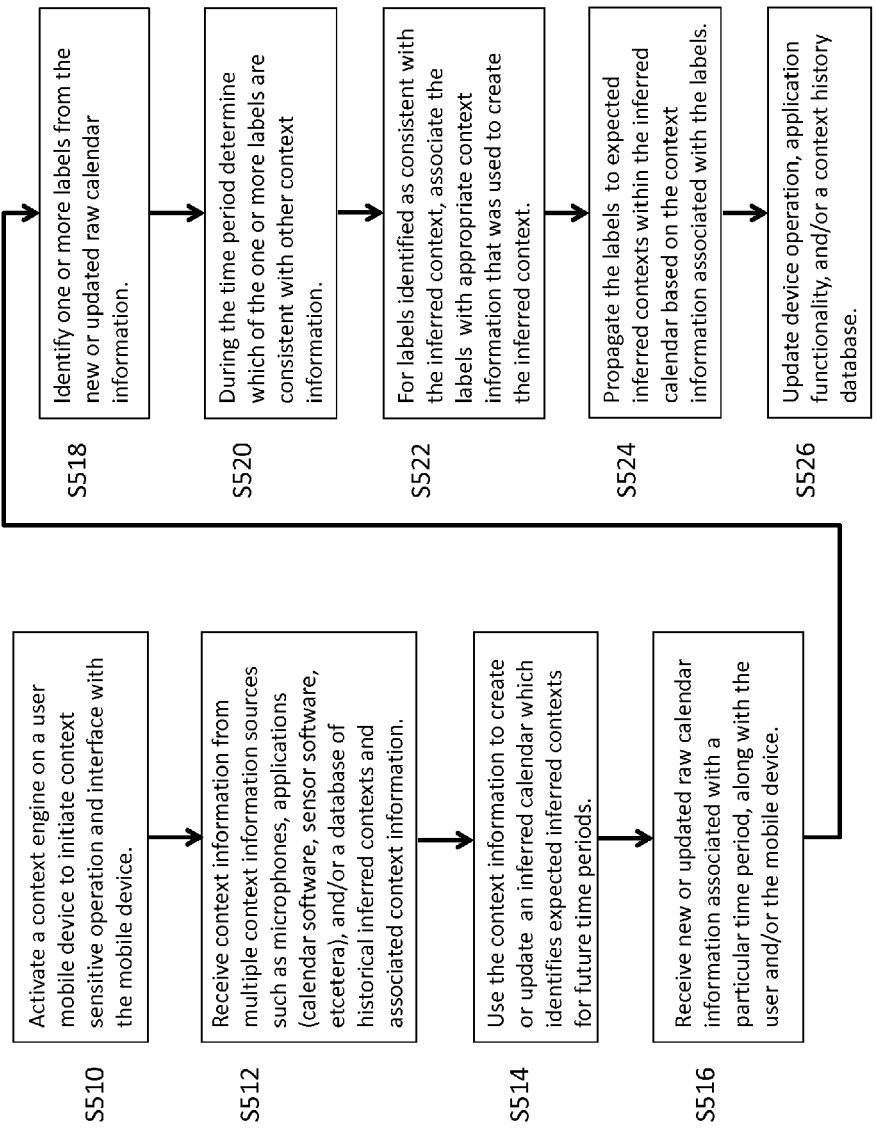
FIG. 5 describes a method of determining an inferred context in accordance with one potential embodiment.

FIG. 5 describes an additional alternative according to aspects of various embodiments. In S510, a device user may activate a context engine on a user mobile device to initiate context sensitive operation and interface with a mobile device. The user may apply to a website to subscribe to context services as part of such an activation, or may download an application as part of such activation. The user may further select user settings, defaults, privacy settings, and other similar settings for operation of a context engine. The user may also provide any required authorizations for the context engine or application to initiate gather of context information from hard and soft sensors on the mobile device and to enable access to this context information by the context engine.

In S512, the context engine may receive context information from one or multiple context information sources. As described above, these may be any sort of hard or soft sensor or application providing information relevant to context in which a mobile device is operating. This may further include database information stored locally on a mobile device or remotely in a server computer. In S514, this information may be used to create a new inferred calendar, or to update an existing inferred calendar.

In S516, new or updated raw calendar information associated with a user or the mobile device and a particular time period may be received. This may include overlapping entries for a calendar resulting in conflicting labels. In S518, one or more labels may be identified from the raw calendar information of S516. In S520, for any labels identified during the time period, a determination is made whether each label is consistent with other context information. This may involve waiting for the actual time period to verify consistency, or may be done using predictive context information, which may further be verified during the actual time period. In S522, for labels identified as consistent with the inferred context, labels are associated with appropriate context information that was used to create the inferred context. Labels which conflict with other context information may be discarded, or a record may be kept that certain labels were inconsistent with the inferred context for future use in predicting a contexts and creation of models for predicting context. If limited context information is available, and all the information is conflicting, a determination may be made that no inferred context may be identified. A system may then store all or some of the context information and wait for additional context information to achieve sufficient confidence to create an inferred context.

In S524, labels consistent with an inferred context and other context information that are associated with each other may then be propagated to other similar contexts with sufficiently similar context information. An additional analysis may be performed within a context engine to determine wither other inferred contexts are sufficiently similar to warrant propagation of a label, and a propagated label may later be changed or removed if conflicting context information arises for an inferred context to which a label was propagated. Finally, in S526, after updates have been made to the system and any device in the system, any changes or transitions identified as part of the device update may be used to transition the device to a new set of features or device settings based on an association between the current inferred context and a set of mobile device settings. As part of this, a context history database, or any additional updates to past inferred contexts, may be made as part of additional analysis based on updates to the device and system.

Thus, using multiple streams of context information, a user's situations can be inferred to a certain extent. By utilizing data present in a scheduling service (e.g., an electronic calendar), user's situations can be matched to various scheduled events when available. To do this, various types of information can be used to understand the calendar matches. In the presence of conflicting events on the calendar, informative sources of data can be combined to infer a match. Further, the calendar can be used as a source to learn the labels of various places visited and/or other labels.

In alternate embodiments, a context or situation of the user is inferred using multiple types of contextual information—for example, indications that a user is at a meeting may include: detecting the presence of speech, detecting or inferring a place visit, and detecting or inferring co-located attendees. In conjunction with the inference of a meeting, the inference can be matched to specific entries associated with the scheduling service (e.g., on an electronic calendar), using certain criteria. For example, a context engine can estimate that a user is or may be in a meeting, then subsequently access calendar information to match the determination to one or more calendar entries.

Calendar information can include information associated with calendar entries of a scheduling service. Calendar information can include event labels (e.g., "meeting"), location labels (e.g., "Conference Room A"), co-attendees (e.g., "John and Bill" or "4 other attendees"), and/or time data (e.g., "3 pm-4 pm" or "start time: 3 pm" or "start time: 3 pm; duration: 1 hour"). A calendar entry can be matched to other context information using, e.g., calendar information. For example, a match to calendar entry #1 can be detected upon determining that: a user is at a location of the entry, a user is with specific co-attendees as noted in the entry, a user is with a number of people as noted as co-attendees in the entry and/or a current time is within a time window noted in the entry.

In one potential embodiment, a calendar entry is matched to other context information by estimating a current place label and comparing the place label to location labels of one or more calendar entries. The place labels can be first estimated using any available information. The place labels can be statistically learned, acquired from a database of background knowledge or points of interest, or inferred via common sense type rules. For example, the place type may be learned by observing collective occupancy patterns to be a conference room or the user's home. The place name may be learned with some user profile information (e.g., identifying a location of "home" or "work"). As another example, a place can be inferred to be the user's office by observing visit patterns to it. Using these place labels, a visit can be matched to a calendar's location label to infer that the user is attending a particular event (e.g., is at a meeting).

Further, there may be other ways of matching the calendar events to the inference. For example, a time-based match that suggests a most probable match of an event if the user's visit to a place (of unknown label) matches approximately in time to the duration of the event on the calendar. As another example, by observing via Bluetooth or other proximity detection techniques, the presence of other users' devices in proximity, it can be inferred whether the user is in a particular meeting (by matching the observed devices/users to the invitees on a meeting).

In some embodiments, calendar-entry matching depends on a plurality of techniques. For example, it may first be determined which current information is available (e.g., whether a current place label is available), and what calendar-entry information is available (e.g., whether a particular event notes co-attendees). Some or all of the available current information can be compared to some or all of the available calendar information for one or more entries. Matches of some types of information (e.g., time data) may be weighted more highly than matches of other types of information (e.g., co-attendee information). A match score may be computed for each of the one or more entries. A calendar event associated with a highest match score or an above-threshold match score may be identified as a match.

Once a calendar match is determined, if the place label is not already known, the label can be acquired from the calendar and propagated to the model of the place corresponding to the visit. Once learned, this information can then be used for subsequent inferences of calendar events and situations. This type of inference can occur on the client or the server in offline or online modes.

FIG. 6 illustrates an example of a computing system in which one or more embodiments may be implemented. A computer system as illustrated in FIG. 6 may be incorporated as part of the previously described computerized devices such as the mobile device of FIG. 2 or any of the elements of a context engine or context inference system as described by FIGS. 1A and 1B. Any component of a system according to various embodiments may include a computer system as described by FIG. 6, including various mobile devices or networked devices and servers. FIG. 6 provides a schematic illustration of one embodiment of a computer system 600 that can perform the methods provided by various other embodiments, as described herein, and/or can function as either a mobile device for which a context is being determined or as a networked computing system which may process context information associated with a mobile device to determine a context of the mobile device. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or similar communication interfaces. The communications subsystem 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an activity selection subsystem configured to provide some or all of the features described herein relating to the selection of activities by a context information module 140 can comprise hardware and/or software that is specialized (e.g., an application-specific integrated circuit (ASIC), a software method, etc.) or generic (e.g., processor(s) 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications). Non-transitory storage media, on the other hand, may not take such forms, and in various embodiments, any storage medium that participates in providing data that causes a machine to operate in a specific fashion may be implemented using non-transitory storage media.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processor(s) 610.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of various embodiments. Also, a number of steps may be undertaken before, during, or after the above elements are considered. Accordingly, the above description does not limit the scope of the disclosure.

What is claimed is:

1. A method comprising:
    accessing context information associated with a mobile device;
    identifying, using the context information, a first inferred context of the mobile device for a first time period to create first inferred calendar information;
    accessing first raw calendar data associated with a user of the mobile device and the first time period;
    identifying from the first raw calendar data, a first label from one or more labels in the first raw calendar data;
    matching the first label and the first inferred context by verifying that the first label is consistent with the first inferred context;
    associating the context information and the first label based on the matching of the first label and the first inferred context; and
    updating the mobile device based on the associating the context information and the first label and based on the matching of the first label and the first inferred context.

2. The method of claim 1, wherein the one or more labels comprise place labeling information associated with a place identifier included in the first raw calendar data.

3. The method of claim 1, wherein the one or more labels comprises person labeling information associated with a person identifier included in the first raw calendar data.

4. The method of claim 1 wherein updating the mobile device based on the matching of the first label and the first inferred context comprises changing a second inferred context for a second time period that is later than the first time period based on the matching of the first label and the first inferred context.

5. The method of claim 1 wherein the context information is derived from mobile device sensors, user interface inputs, and network communications.

6. The method of claim 1 wherein updating the mobile device based on the matching of the first label and the first inferred context comprises:

matching the first inferred context to a second inferred context associated with a second time period different than the first time period using the context information; and
propagating the first label to the second inferred context.

7. The method of claim 6 wherein propagating the first label to the second inferred context comprises altering a second label associated with the second inferred context to match the first label.

8. The method of claim 1, wherein the context information comprises a context stream of sensor information from a hardware sensor, and where updating the mobile device based on the matching of the first label and the first inferred context comprises associating labeling information and the sensor information.

9. The method of claim 1 further comprising:
    accessing second raw calendar data associated with the user of the mobile device and the first time period;
    identifying from the second raw calendar data, a second label from one or more labels in the second raw calendar data;
    determining that the second label is inconsistent with the first inferred context prior to associating the context information and the first label based on the matching of the first label and the first inferred context.

10. A device comprising:
    a sensor that accesses context information associated with the device;
    a memory that stores raw calendar data including a first raw calendar data comprising at least a first label;
    a processor that receives the context information from the sensor and identifies, using the context information, a first inferred context of the device for a first time period to create first inferred calendar information, that further receives the first raw calendar data and identifies the first label from one or more labels in the first raw calendar data, that matches the first label and the first inferred context by verifying that the first label is consistent with the first inferred context, that associates the context information and the first label based on the matching of the first label and the first inferred context, and that updates the device based on the associating the context information and the first label.

11. The device of claim 10 further comprising:
    a display module coupled to the processor;
    wherein an output to the display module from the processor is adjusted as part of the update of the device based on the associating of the context information and the first label.

12. The device of claim 11 wherein the sensor comprises a location module comprising a global positioning system receiver that receives location signals and wherein the context information identifies a location of the device.

13. The device of claim 11 wherein the sensor comprises a Bluetooth module, and wherein the context information identifies other Bluetooth modules in proximity to the device.

14. The device of claim 11 wherein the sensor comprises a calendar application executed by the processor, and wherein the context information comprises the first raw calendar data.

15. The device of claim 11 further comprising:
    a user input module that receives rules and constraints from a user, wherein the adjustment to the output to the display module is based on the rules and constraints.

16. A device comprising:
    means for receiving context information associated with the device;

means for receiving raw calendar data including a first raw calendar data associated with the device;

a processor that receives the context information and identifies, using the context information, a first inferred context of the device for a first time period to create first inferred calendar information, that further receives the first raw calendar data and identifies a first label from one or more labels in the first raw calendar data, that matches the first label and the first inferred context by verifying that the first label is consistent with the first inferred context, and that associates the context information and the first label based on the matching of the first label and the first inferred context; and means for updating the device based on the associating the context information and the first label.

17. A non-transitory computer readable memory comprising computer readable instructions that, when executed by a processor, cause a device including the processor to perform a method of context inferrence comprising:

accessing context information associated with a mobile device;

identifying, using the context information, a first inferred context of the mobile device for a first time period to create first inferred calendar information;

accessing first raw calendar data associated with a user of the mobile device and the first time period;

identifying from the first raw calendar data, a first label from one or more labels in the first raw calendar data;

matching the first label and the first inferred context by verifying that the first label is consistent with the first inferred context;

associating the context information and the first label based on the matching of the first label and the first inferred context; and updating the mobile device based on the associating the context information and the first label and based on the matching of the first label and the first inferred context.

18. The non-transitory computer readable memory of claim 17 wherein the method performed by execution of the computer readable instructions further comprises:

accessing second raw calendar data associated with the user of the mobile device and the first time period;

identifying from the second raw calendar data, a second label from one or more labels in the second raw calendar data; and determining that the second label is inconsistent with the first inferred context prior to associating the context information and the first label based on the matching of the first label and the first inferred context.

19. A device comprising:

means for accessing context information associated with the device;

means for identifying, using the context information, a first inferred context of the device for a first time period to create first inferred calendar information;

means for accessing first raw calendar data associated with a user of the device and the first time period;

means for identifying from the first raw calendar data, a first label from one or more labels in the first raw calendar data;

means for matching the first label and the first inferred context by verifying that the first label is consistent with the first inferred context;

means for associating the context information and the first label based on the matching of the first label and the first inferred context; and means for updating the device based on the associating the context information and the first label and based on the matching of the first label and the first inferred context.

20. The device of claim 19 wherein the context information comprises location signature information received, at least in part, by a network assisted location service.

21. The device of claim 19 further comprising:

means for updating a user interface presented by the device based on the associating the context information and the first label and based on the matching of the first label and the first inferred context.

* * * * *